US007886186B2

(12) United States Patent
Kumagai

(10) Patent No.: US 7,886,186 B2
(45) Date of Patent: Feb. 8, 2011

(54) STORAGE SYSTEM AND MANAGEMENT METHOD FOR THE SAME

(75) Inventor: Atsuya Kumagai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 457 days.

(21) Appl. No.: 11/968,789

(22) Filed: Jan. 3, 2008

(65) Prior Publication Data
US 2008/0244306 A1 Oct. 2, 2008

(30) Foreign Application Priority Data
Mar. 29, 2007 (JP) .............................. 2007-088451

(51) Int. Cl.
*G06F 12/16* (2006.01)
(52) U.S. Cl. ................... 714/7; 714/3; 714/5
(58) Field of Classification Search ..................... 714/3, 714/7
See application file for complete search history.

(56) References Cited

U.S. PATENT DOCUMENTS

| 7,647,525 B2 * | 1/2010 | Lecrone et al. ................. 714/6 |
| 2002/0103943 A1 * | 8/2002 | Lo et al. ......................... 710/2 |
| 2004/0225914 A1 * | 11/2004 | Burton et al. .................. 714/13 |
| 2004/0250034 A1 * | 12/2004 | Yagawa et al. ............... 711/162 |
| 2004/0268177 A1 * | 12/2004 | Ji et al. ........................... 714/6 |
| 2005/0102549 A1 * | 5/2005 | Davies et al. .................. 714/4 |
| 2005/0108187 A1 * | 5/2005 | Fujibayashi .................... 707/1 |
| 2005/0251633 A1 * | 11/2005 | Micka et al. ................. 711/162 |
| 2005/0256972 A1 * | 11/2005 | Cochran et al. ............. 709/245 |
| 2006/0112173 A1 * | 5/2006 | Cohn et al. .................. 709/220 |
| 2006/0168415 A1 * | 7/2006 | Ishii et al. ................... 711/165 |
| 2006/0212747 A1 * | 9/2006 | Okamoto et al. ............... 714/6 |
| 2006/0248295 A1 | 11/2006 | Uchiyama et al. |
| 2007/0234108 A1 * | 10/2007 | Cox et al. ...................... 714/6 |
| 2008/0072001 A1 * | 3/2008 | Ashour et al. ............... 711/162 |

FOREIGN PATENT DOCUMENTS

JP 2006-309447 11/2006

\* cited by examiner

*Primary Examiner*—Scott T Baderman
*Assistant Examiner*—Chae Ko
(74) *Attorney, Agent, or Firm*—Brundidge & Stanger, P.C.

(57) ABSTRACT

In a storage system performing remote copy, when a failure occurs in a storage apparatus, optimum redundancy configuration is reestablished promptly. In the storage system performing remote copy, when a storage apparatus detects a failure in its disk drive, a storage apparatus capable of providing a logical unit that can be a replacement for the logical unit affected by the failure in the disk drive is searched for based on storage apparatus performance, and a redundancy configuration is reestablished using a new logical unit the found storage apparatus provides.

15 Claims, 17 Drawing Sheets

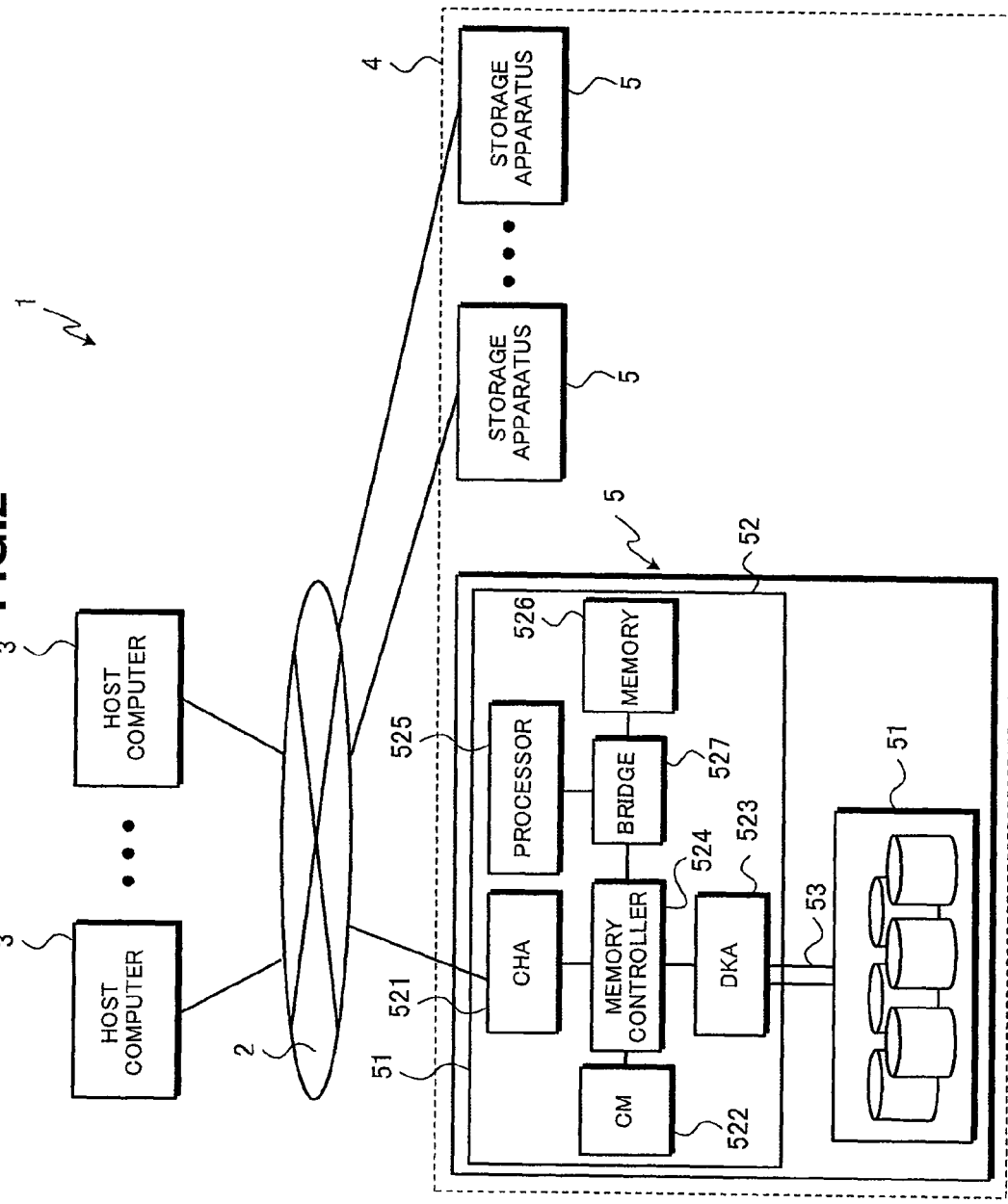

FIG.4

| LUN | DISC CAPACITY (GB) | | | | REQUIRED RESPONSE TIME (ms) |
|---|---|---|---|---|---|
| | DISK 1 | DISK 1 | DISK 1 | DISK 1 | |
| 0 | 100 | 100 | —— | —— | 20 |
| 1 | 200 | 200 | —— | —— | 30 |
| 2 | —— | —— | 100 | 100 | 30 |
| 3 | —— | —— | 100 | 100 | 20 |
| 4 | —— | —— | 200 | 200 | 20 |
| : | : | : | : | : | : |

FIG.16A

| PRIMARY | SYNCHRONOUS | ASYNCHRONOUS |
|---------|-------------|--------------|
| S002-1  | S004-9      | S003-4       |
| :       | :           | :            |

FIG.16B

| PRIMARY | SYNCHRONOUS | ASYNCHRONOUS |
|---------|-------------|--------------|
| S002-1  | S003-4      | S005-3       |
| :       | :           | :            |

FIG.16C

| PRIMARY | SYNCHRONOUS | ASYNCHRONOUS |
|---------|-------------|--------------|
| :       | :           | :            |
| S002-0  | S004-9      | S003-5       |
| :       | :           | :            |

FIG.16D

| PRIMARY | SYNCHRONOUS | ASYNCHRONOUS |
|---------|-------------|--------------|
| :       | :           | :            |
| S002-0  | S003-5      | S005-3       |
| :       | :           | :            |

FIG.16E

| PRIMARY | SYNCHRONOUS | ASYNCHRONOUS |
|---------|-------------|--------------|
| :       | :           | :            |
| S002-2  | S004-2      | S005-3       |
| :       | :           | :            |

STORAGE SYSTEM AND MANAGEMENT METHOD FOR THE SAME

CROSS-REFERENCES TO RELATED APPLICATIONS

This application relates to and claims priority from Japanese Patent Application No. 2007-088451, filed on Mar. 29, 2007, the entire disclosure of which is incorporated herein by reference.

BACKGROUND

1. Field of the Invention

The present invention relates to a storage system for storing data and, in particular, to a management technique for a storage system including a plurality of storage apparatuses adopting a redundancy configuration.

2. Description of Related Art

Data stored in a storage apparatus is usually backed up in another storage apparatus, which is a redundant storage apparatus, to prevent data loss due to failures in disk drives in the storage apparatuses. An exemplary backup technique is called 'remote copy.' With the remote copy technique, data is managed so that data is synchronously or asynchronously copied between a primary storage apparatus and a physically-separate storage apparatus, with the two apparatuses being defined as a pair. As a result, data consistency between the storage apparatuses is ensured, and even if a failure occurs in the primary storage apparatus, the stand-by storage apparatus can take over receiving I/O access from the host computer from the primary storage apparatus.

JP2006-309447 A discloses a technique where a first storage apparatus stores data sent from a host system and transfers the stored data to second and third storage apparatuses so that the second and third storage apparatuses each store the transferred data. In addition, the second and third storage apparatuses mutually verify the data they store.

In a storage system utilizing the remote copy technique, when a failure occurs in one of storage apparatuses, a different standby storage apparatus takes over receiving I/O access from the host computer targeting the faulty storage apparatus from the faulty storage apparatus, thereby allowing the host computer to continue I/O access with the standby storage apparatus.

However, because no redundant storage apparatus is left after the standby storage apparatus has taken over receiving I/O access, the redundancy configuration has to be reestablished as soon as possible. Conventionally, a system administrator has to reestablish the redundancy configuration, which is an extremely complicated task, using his/her experience alone.

SUMMARY

This invention provides a storage system for performing remote copy, wherein, when a storage apparatus detects a failure in its disk drives, it searches for another storage apparatus capable of providing a new logical unit for use as a replacement for the logical unit affected by the failure in the disk drive based on storage apparatus performance; and the found storage apparatus reestablishes the redundancy configuration using the new logical unit.

According to one aspect of the present invention, the invention is directed to a storage system including a plurality of storage apparatuses, each of which includes one or more disk drives forming at least one logical unit, and a controller that controls the disk drive(s). Each controller in the storage apparatuses has a role table where the logical units in the different storage apparatuses are associated with one another and the roles of these logical units are defined. A first controller in a first storage apparatus executes remote copy between in its logical unit and a logical unit associated with that logical unit in accordance with the role table.

When the first controller detects a failure in the first disk drives under its control, the first controller sends status information about that failure to at least a second storage apparatus in the plurality of storage apparatuses. The second controller in the second storage apparatus searches for storage apparatuses capable of providing a logical unit that can be a replacement for the first logical unit formed in the first disk drive, selects, from among the found storage apparatuses, a predetermined storage apparatus and sends a request to create a logical unit to that selected predetermined storage apparatus.

According to one aspect of the present invention, the invention is directed to a management method for a storage system including a plurality of storage apparatuses that perform remote copy. The management method includes: providing a role table defining a logical unit assigned the role of a primary logical unit, a logical unit assigned the role of a synchronous logical unit to which synchronous remote copy is performed from the primary logical unit, and a logical unit assigned the role of an asynchronous logical unit to which asynchronous remote copy is performed from the synchronous logical unit; detecting, under control of a first controller in a first storage apparatus, a failure in a first disk drive; when detecting a failure in the first disk drive, sending status information about that failure to a second storage apparatus from among the plurality of storage apparatuses. The method further includes: searching, under control of the second storage apparatus, for a storage apparatus capable of providing a logical unit that can be a replacement for the first logical unit formed in the first disk drive; selecting, under control of the second storage apparatus, a predetermined storage apparatus from among the found storage apparatuses; and sending a logical unit creation request to the selected, predetermined storage apparatus from the second storage apparatus.

According to one aspect of the present invention, the invention is directed to a storage system including: a first storage apparatus having a first disk drive where a first logical unit is formed and a first controller that controls the first disk drive; a second storage apparatus connected to the first storage apparatus and having a second disk drive where a second logical unit is formed and a second controller that controls the second disk drive; and a third storage apparatus connected to the second storage apparatus and having a third disk drive where a third logical unit is formed and a third controller that controls the third disk drive.

The first controller has a role table that defines roles in remote copy for the first logical unit and second logical unit, and copies the content of the first logical unit to the second logical unit in accordance with the role table.

When the first controller detects a failure in the first disk drive, it sends status information about that failure to the second storage apparatus; and in accordance with the status information received, the second controller sends a request to create a logical unit to the third storage apparatus.

Accordingly, with this invention, in a storage system utilizing the remote copy technique, when a failure occurs in one of storage apparatuses, a different, standby storage apparatus takes over receiving I/O access and reestablishes an optimum redundancy configuration using the remaining storage apparatuses.

BRIEF DESCRIPTION OF THE DRAWINGS

FIG. 2 is a diagram showing the configuration of a computer system according to an embodiment of the invention.

FIG. 4 is a diagram illustrating an example of an LU table stored in memory in the storage apparatus according to an embodiment of the invention.

FIGS. 16A-16E are diagrams showing a part of the role table shown in FIG. 5.

DETAILED DESCRIPTION OF PREFERRED EMBODIMENTS

Embodiments of the invention are explained below with reference to the drawings.

Figure 1A:
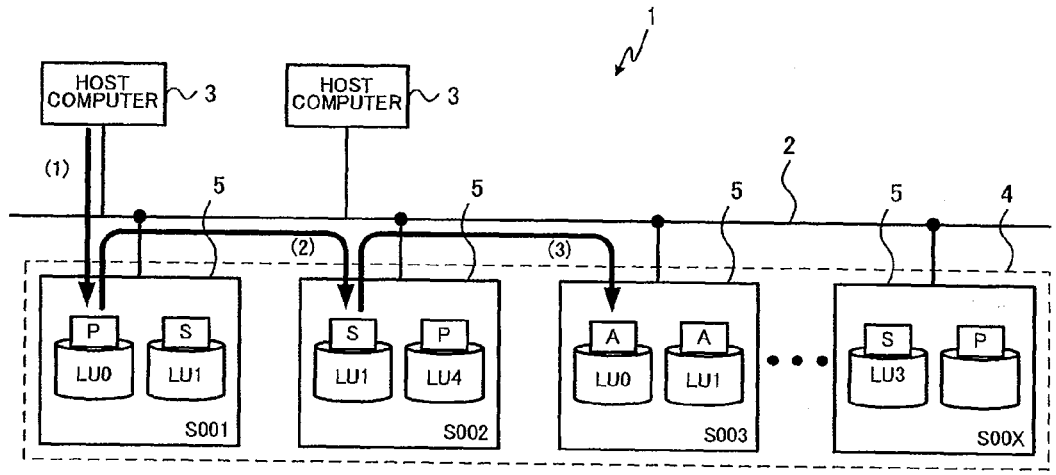
FIGS. 1A-1C are conceptual diagrams illustrating redundancy configuration reestablishment in a storage system according to an embodiment of the invention.
Figure 1B:
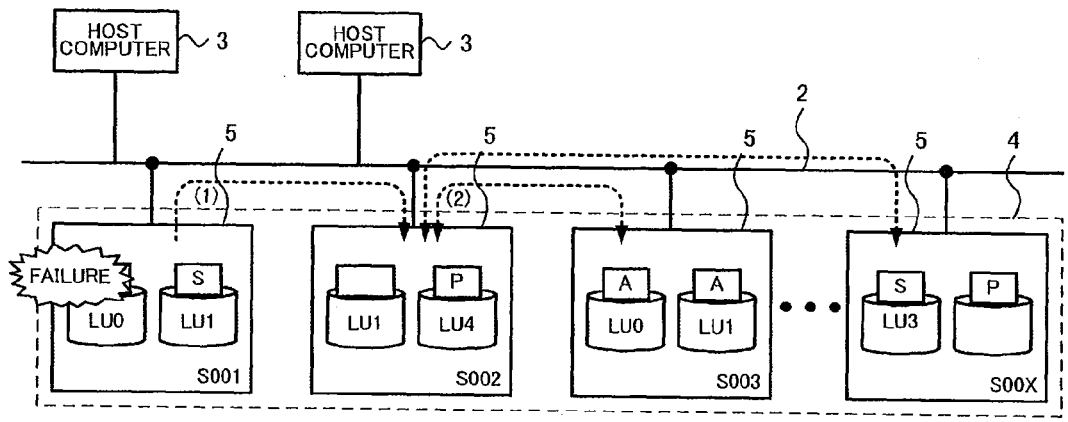
Figure 1C:
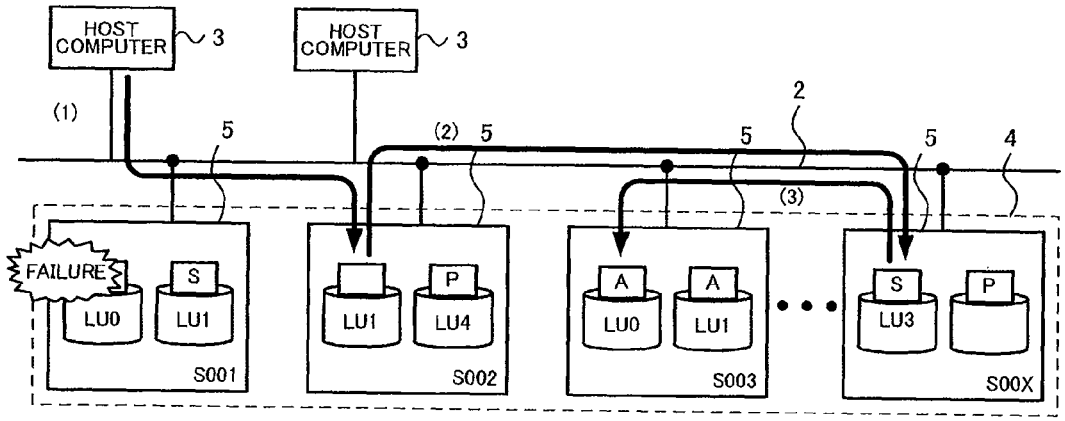

FIGS. 1A-1C are conceptual diagrams illustrating redundancy configuration reestablishment in a storage system according to an embodiment of the invention.

In FIGS. 1A-1C, a computer system 1 is configured to include host computers 3 and a storage system 4 connected to the host computers 3 via a network 2. The storage system 4 includes a plurality of redundant storage apparatuses 5. The respective storage apparatuses 5 are labeled "S001" to "S00n" for identifying themselves.

Each storage apparatus 5 has logical units LU. The logical units LU are units of logical volumes host computers 3 I/O-access. A logical unit LU in a storage apparatus 5 is associated with a logical unit LU in another storage apparatus 5, each logical unit LU being assigned a "role" in remote copy. Each storage apparatus 5 stores a remote copy program for playing its role in the remote copy.

The "roles" typically include "primary," "synchronous," and "asynchronous." The host computers 3 I/O-access the logical units assigned the primary roles (primary logical units). Logical units assigned the synchronous roles (synchronous logical units) serve as backup logical units LU for the primary logical units LU, and synchronous remote copy is performed between the primary logical units and the synchronous logical units. Logical units assigned the asynchronous roles (asynchronous logical units) also serve as backup logical units LU, and asynchronous remote copy is performed between the synchronous logical units and the asynchronous logical units.

Accordingly, with the synchronous remote copy, when the content of a logical unit LU—one of a pair—changes due to the I/O access from a host computer 3, copy is performed so that the change is reflected in a logical unit LU—the other of the pair—substantially simultaneously. In contrast, with the asynchronous remote copy, a change in a logical unit LU—one of a pair—is reflected in another logical unit—the other of the pair—at regular or irregular time intervals, not depending on I/O-access requests.

In this example, a logical unit LU0-P in a storage apparatus 5 identified by its storage apparatus name "S001" (hereinafter called "storage apparatus S001") is defined as a primary logical unit, and a backup logical unit LU1-S in a storage apparatus S002 is defined as a synchronous logical unit; accordingly, synchronous remote copy is performed between them. Another backup logical unit LU0-A in a storage apparatus S003 is defined as an asynchronous logical unit, and accordingly, asynchronous remote copy is performed between this asynchronous logical unit and the synchronous logical unit LU1-S in the storage apparatus S002.

In the computer system 1 including the above-described storage system 4, a host computer 3 sends an I/O access request to the primary logical unit LU0-P ((1) in FIG. 1A). The storage apparatus S001 provides an I/O service to the host computer 3 in response to the I/O access request; and performs remote copy with the logical unit LU1-S in the storage apparatus S002 associated with the primary logical unit LU0-P so that data consistency between the primary logical unit LU0-P and the synchronous logical unit LU1-S is ensured ((2) in FIG. 1A). Meanwhile, independently from (not in synchronization with) the I/O access request, the storage apparatus S002 performs remote copy with the asynchronous logical unit LU0-A in the storage apparatus S003 to maintain data consistency between the logical unit LU1-S and the logical unit LU0-A ((3) in FIG. 1A).

Should, during the operation of the computer system 1, a failure occur in the disk drives forming the primary logical unit LU0-P and the storage apparatus S001 can no longer provide the logical unit LU0-P to the host computers 3, the storage apparatus S001 reports the failure occurrence to the associated storage apparatus 5 (i.e., the storage apparatus S002) ((1) in FIG. 1B). Having received the report, the storage apparatus S002 searches the other communicable storage apparatuses 5 on the network 2 for an optimum storage apparatus 5 capable of reestablishing the redundancy structure; and reestablishes the redundancy structure including that storage apparatus 5 ((2) in FIG. 1B). In other words, the storage apparatus S002 changes its synchronous logical unit LU1-S, which had been a backup logical unit LU, to a primary logical unit LU1-P; selects a logical unit LU3 in a storage apparatus S00n; and defines it as a synchronous logical unit. The storage apparatus S002 also defines the logical unit LU0-A in the storage apparatus S003 again as an asynchronous logical unit.

Thus, when a host computer sends an I/O access request to the new primary logical unit LU1-P in the storage apparatus S002 ((1) in FIG. 1C), the storage apparatus S002 responds to the I/O access request from the host computer 3; and performs remote copy with the logical unit LU3-S in the storage apparatus S00x newly-associated with the logical unit LU1-P so that data consistency is maintained between the primary logical unit LU1-P and the synchronous logical unit LU3-S ((2) in FIG. 1C). The storage apparatus S00x performs remote copy with the asynchronous logical unit LU0-A in the storage apparatus S003, not in synchronization with the I/O access request, to maintain data consistency between the synchronous logical unit LU3-S and the asynchronous logical unit LU0-A ((3) in FIG. 1C).

FIG. 2 is a diagram showing the configuration of a computer system 1 according to an embodiment of the invention. As shown in FIG. 2, the computer system 1 includes host computers 3 and a storage system 4 connected to the host computers 3 via a network 2; and is configured as a bank service system, an air seat reservation system, or the like. The computer system 1 may include a management console.

The network 2 is, for example, a LAN, the Internet, or a SAN (Storage Area Network) and is configured to include a network switch or hubs. In this embodiment, it has been assumed that the network 2 is configured with a SAN using TCP/IP-based iSCSI. However, the network 2 is not limited to a SAN and may alternatively be structured with a SAS (FC-SAN) using Fibre Channel Protocol.

The host computers 3, for example, serve as the core part of the system, such as a bank service system or air seat reservation system. More specifically, each host computer 3 includes hardware resources such as a processor, a main memory, a communication interface, an input/output devices such as a keyboard and display; and software resources such as device drivers, operating system (OS), application programs, etc. (not shown in the drawing). With these software resources, the host computer 3 runs various programs under the control of their processors, and thereby perform desired processing in cooperation with the hardware resources. For example, the host computer 3 runs a business application program on their OS under the control of the processors, thereby accessing the storage system 4, which will be described later in detail, and achieving the desired business service.

The storage system 4 provides the host computer with storage areas for storing data. The storage system 4 includes a plurality of storage apparatuses 5, each having one or more logical devices LDEV. The logical devices LDEV, which are recognizable to the host computers 3, are associated with physical disk drives PDEV.

In typical implementation, virtual devices VDEV are defined for some physical devices PDEV and the storage apparatuses 5 allocate their logical devices LDEV to these virtual devices VDEV.

Furthermore, logical units LU are defined for the logical devices LDEV. Each logical unit LU is assigned a logical unit number LUN. Each logical unit LU is divided into blocks, which are the smallest unit in I/O access, and each block is assigned a logical block address LBA. A host computer 3 gives a logical address, which is composed of a logical unit number LUN and logical block address LBA, to a storage apparatus 5 in order to I/O-access the data stored in an arbitrary storage area in a specified logical unit LU.

More specifically, each storage apparatus 5 includes a plurality of disk drives 51—physical devices PDEV—and a disk controller 52 that controls I/O access, such as writing/reading of data to/from the disk drives 51. The disk drives 51 and disk controller 52 are operatively connected via disk channel(s) 53.

The disk drives 51 are composed of storage media, for example, hard disk drives or non-volatile memory. The disk drives 51 may form a RAID (Redundant Arrays of Independence Disks) configuration.

The disk controller 52 includes, among other things, a channel adapter (CHA) 521, cache memory (CM) 522, and disk adapter (DKA) 523, with these modules or components being connected to one another via a memory controller 524. The memory controller 524 is connected via a bridge 527 to a processor 525 and memory 526. Although FIG. 2 shows one module of each type, the respective modules may be structured with redundancy, in the form of two or more modules of each type.

The channel adapter 521 is a system circuit having a plurality of ports (not shown in the drawing) and serving as a communication interface that communicates with the port-connected host computers 3 via the network 2 in accordance with I/O access requests.

The cache memory 522 temporarily stores the data transmitted between the host computers 3 and the disk drives 51 in order to provide high system performance to the host computers 3. In other words, the cache memory 522 is used for data transfer between the channel adapter 521 and the disk adapter 523.

The disk adapter 523 is a component or system circuit having a plurality of ports (not shown in the drawing) and serving as an interface that controls the I/O access to the disk drives 51 connected to the ports via the disk channel 53. In other words, the disk adapter 523 takes data out of the cache memory 522 and stores the data in the disk drive(s) 51, or reads data from the disk drive(s) 51 and writes the data in the cache memory 522.

Figure 3:
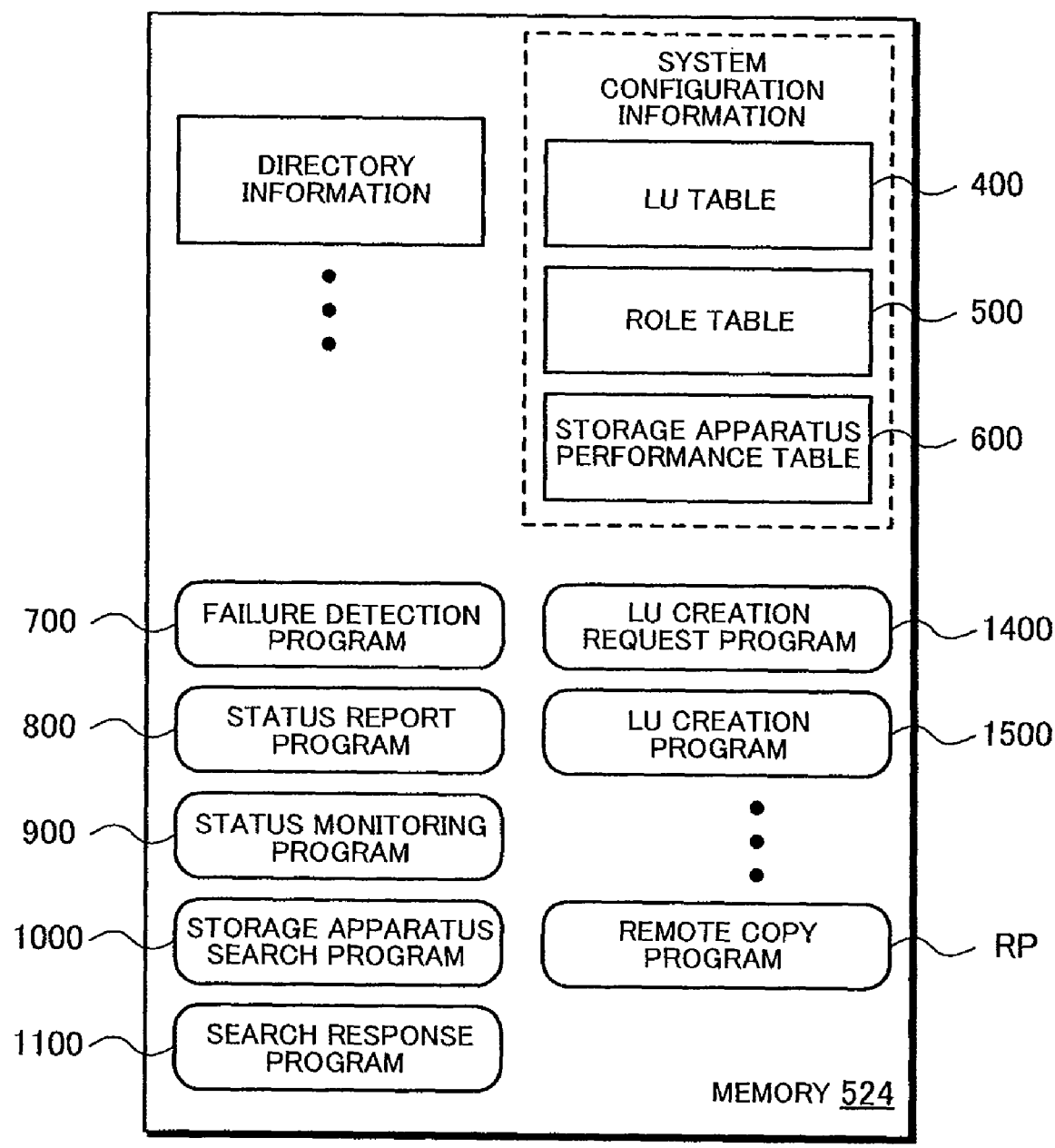
FIG. 3 is a diagram illustrating an example of memory in a storage apparatus according to an embodiment of the invention.

The processor 525 runs various programs, such as the ones shown in FIG. 3, stored in the memory 526; and executes the processing for redundancy configuration reestablishment. Details of the processing executed by the respective programs under the control of the processor 525 will be described later. The memory 526 stores system configuration information and directory information related to its own storage apparatus 5 and serves as a shared memory for the channel adapter 521 and disk adapter 523.

Returning to FIG. 2, the memory controller 524 includes a switching device composed of, for example, a crossbar switch or the like. It arbitrates the competition of to-be-input data signals; switches paths for the data signals; and establishes paths from send source modules and send destination modules.

FIG. 4 is a diagram illustrating an example of an LU table 400 stored in the memory 526 in the storage apparatus 5 according to an embodiment of the invention. The LU table 400 is unique to each storage apparatus 5.

As shown in FIG. 4, the LU table 400 includes an LUN field 401, disk capacity field 402, and required response time field 403. The LUN field 401 shows the logical identification numbers (i.e., logical unit number LUN) of logical units LU formed in the disk drives 51 in the storage apparatus 5. As is clear from the disk capacity field 402, each logical unit LU may be composed of four disk drives 51 (indicated as "disk 1"

to "disk 4" in this example). The disk capacity field 402 shows the post-formatting storage capacity of each disk drive 51. For example, the logical unit identified by the LUN "0"—logical unit LU0—is composed of the disks 1 and 2, and its capacity is 200 GB. The required response time field 403 shows the access response times required for the respective logical units LU. Small values stored in the required response time field 403 mean that high specifications are required. For example, the logical unit identified by the LUN "0"—logical unit LU0—in the storage apparatus S002 is composed of the disks 1 and 2 and is required to have a response time of 20 ms.

Figure 5:
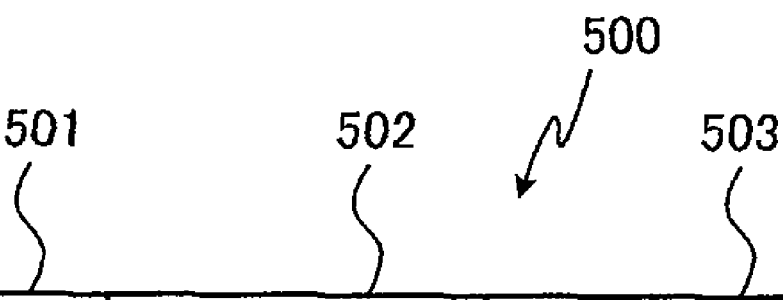
FIG. 5 is a diagram illustrating an example of a role table stored in memory in the storage apparatus according to an embodiment of the invention.

FIG. 5 is a diagram illustrating an example of a role table 500 stored in memory 526 in the storage apparatus 5 according to an embodiment of the invention. The role table 500 defines the role in remote copy for each logical unit LU. In this example, the roles are "primary," "synchronous," and "asynchronous." "Primary" indicates a logical unit LU serving as a primary logical unit LU. "Synchronous" indicates a logical unit LU serving as a backup synchronous logical unit LU for the primary logical unit LU, for which synchronous remote copy is performed. "Asynchronous" indicates a logical unit LU serving as a backup asynchronous logical unit LU, and asynchronous remote copy is performed between the synchronous logical unit LU and asynchronous logical unit. Each storage apparatus 5 has a role table 500 having the same content.

In other words, as shown in FIG. 5, the role table 500 includes a primary LU field 501, synchronous LU field 502, and asynchronous LU field 503. Logical units LU in the storage apparatuses 5 are registered in these fields 501-503 according to their roles, in their storage apparatus names in combination with logical unit numbers (LUN). For example, the logical unit having the logical unit number LUN "0" and belonging to the storage apparatus S001 (i.e., the logical unit "S001-0") serves as a primary logical unit LU. The logical unit having logical unit number LUN "1" and belonging to the storage apparatus S002 (i.e., the logical unit "S002-1") serves as a backup synchronous logical unit LU and synchronous remote copy is performed between the logical unit S001-0 and the logical unit S002-1. The logical unit having the logical unit number LUN "4" and belonging to the storage apparatus S003 (i.e., the logical unit "S003-4") serves as a backup asynchronous logical unit LU, and asynchronous remote copy is performed for the logical unit S002-1 and the logical unit S003-4.

Figure 6:
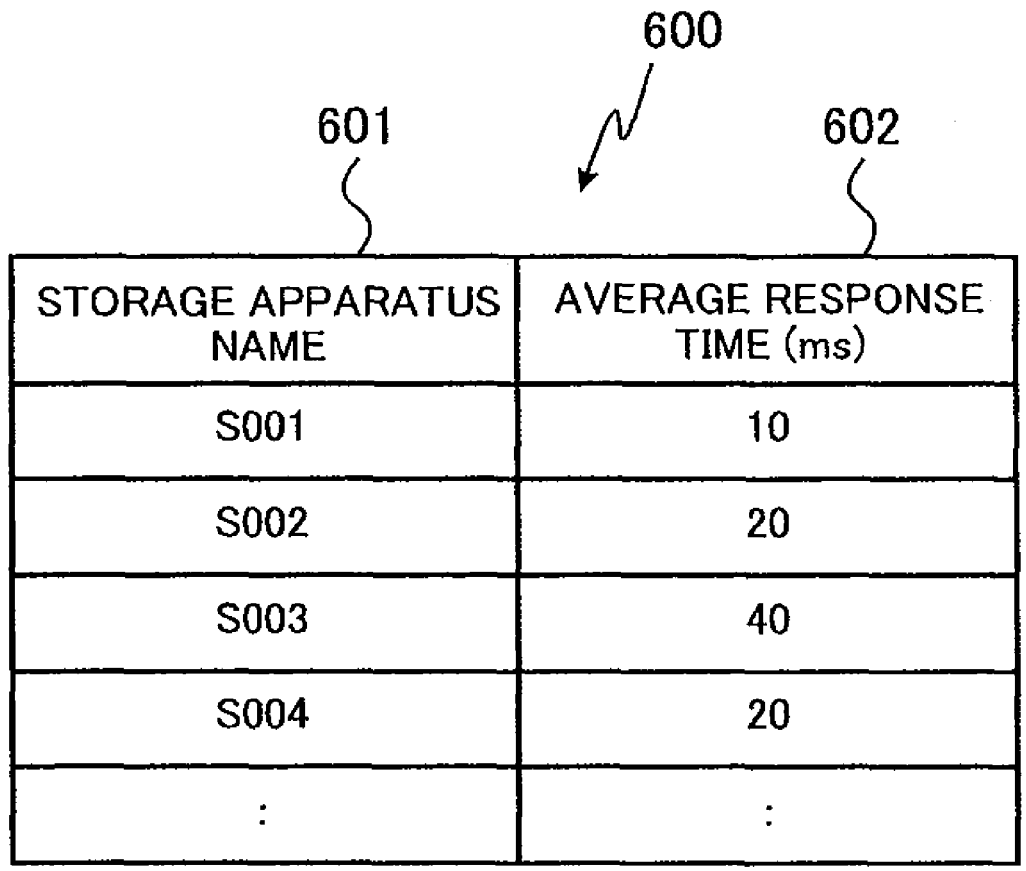
FIG. 6 is a diagram illustrating an example of a storage apparatus performance table stored in memory in the storage apparatus according to an embodiment of the invention.

FIG. 6 is a diagram illustrating an example of a storage apparatus performance table 600 stored in memory 526 in each storage apparatus 5 according to an embodiment of the invention.

The storage apparatus performance table 600 includes a storage apparatus name field 601 and average response time field 602, and shows the computed average response times for the respective storage apparatuses 5. For example, according to this table, the average value of the response times of the storage apparatus S001 is 10 ms. The channel adapter 521 measures and collects the times required to respond to the I/O access requests from the host computers 3; and calculates the average value.

Figure 7:
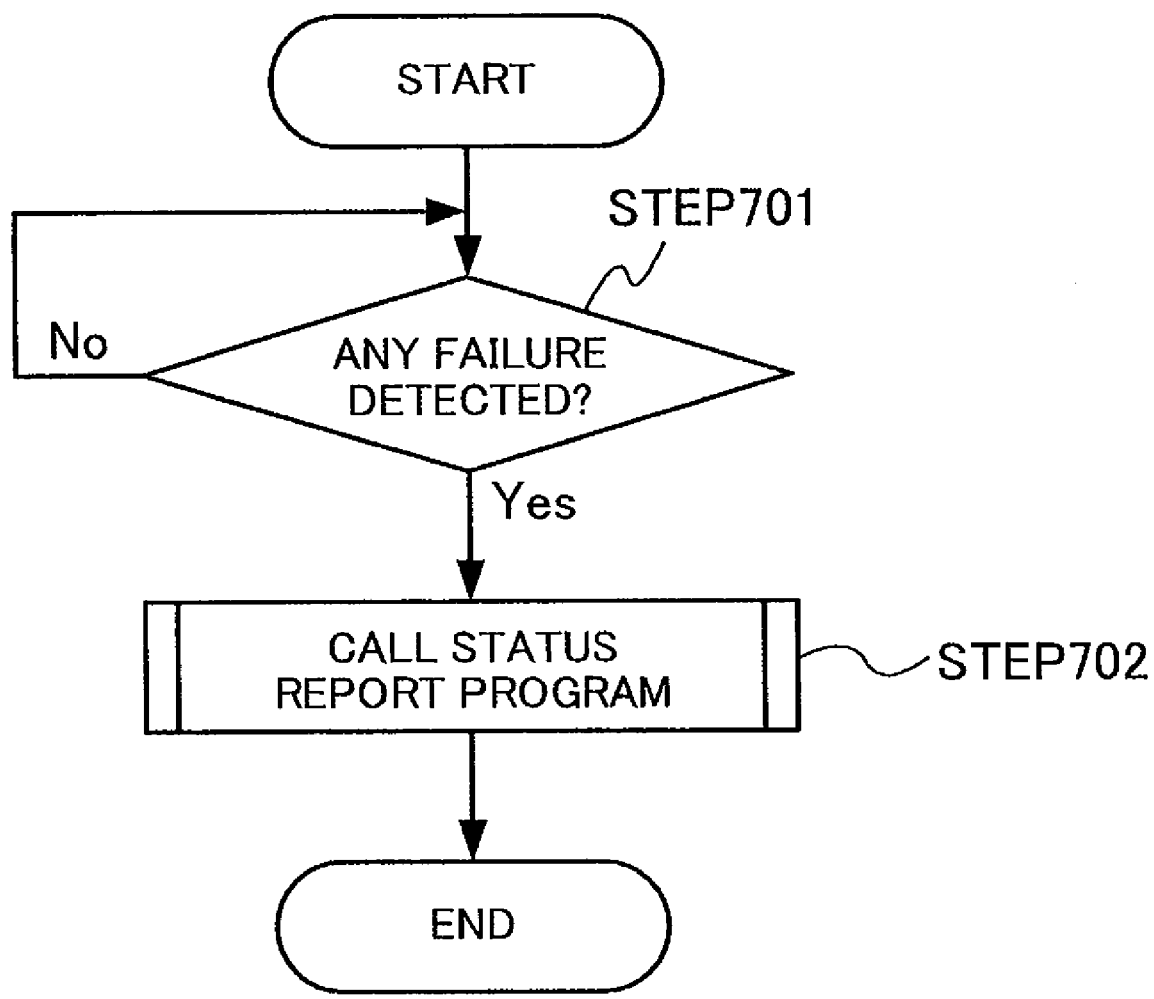
FIG. 7 is a flowchart for explaining the processing executed by a failure detection program in the storage apparatus according to an embodiment of the invention.

FIG. 7 is a flowchart for explaining the processing executed by a failure detection program 700 in the storage apparatus 5 according to an embodiment of the invention. Each storage apparatus 5 runs, under the control of its processor 525, the failure detection program 700 to detect any failure in its modules.

As shown in FIG. 7, during the operation of the storage apparatus 5, the failure detection program 700 monitors the respective modules to detect any failure (STEP701). For example, the failure detection program 700 collects failure information from each module. In this embodiment, the failure detection program 700 monitors the disk drives 51 in particular to detect a failure. If the failure detection program 700 detects a failure in the disk drives 51, the failure detection program 700 calls a status report program 800 (STEP702).

Figure 8:
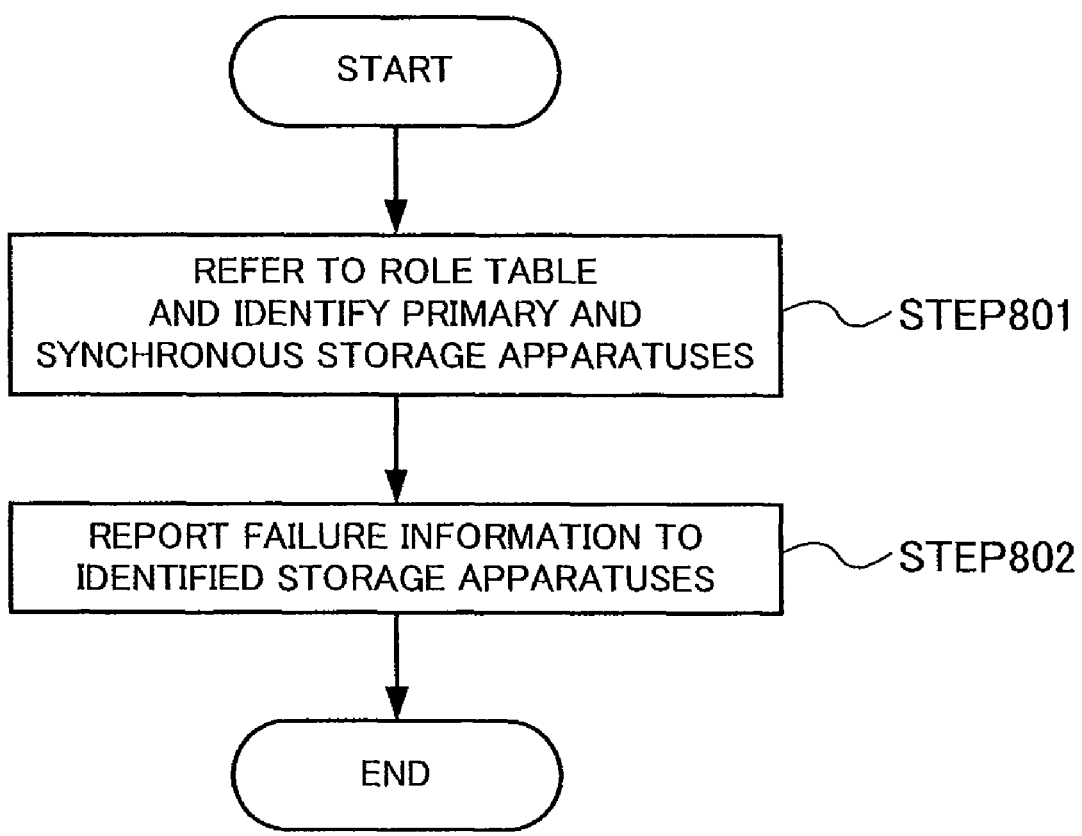
FIG. 8 is a flowchart for explaining the processing executed by a status report program in the storage apparatus according to an embodiment of the invention.

FIG. 8 is a flowchart for explaining the processing executed by the status report program 800 in the storage apparatus 5 according to an embodiment of the invention. The storage apparatus 5 runs, under the control of its processor 525, the status report program 800 and, as a consequence, reports a failure to the other storage apparatuses 5.

As shown in FIG. 8, having been called by the failure detection program 700, the status report program 800 identifies, with reference to the role table 500, identifies all the storage apparatuses 5 registered in the primary LU field 501 and synchronous LU field 502 (STEP801). The status report program 800 then sends its own storage apparatus name and status information (failure information) to the identified storage apparatuses 5 (STEP802). The failure information includes, for example, the logical unit number LUN of the logical unit LU that appears to be affected by the failure.

For example, if the storage apparatus S001 detects a failure in its disk drives 51 that appears to affect the logical unit LU0 (S001-0), the storage apparatus S001 reports its status to the other storage apparatuses 5 including the storage apparatus S002 by referring to the LU table 400 shown in FIG. 4. Having received the report, the other storage apparatuses 5 run the status monitoring program, which will be described later, to make an attempt to reestablish redundancy configuration.

Figure 9:
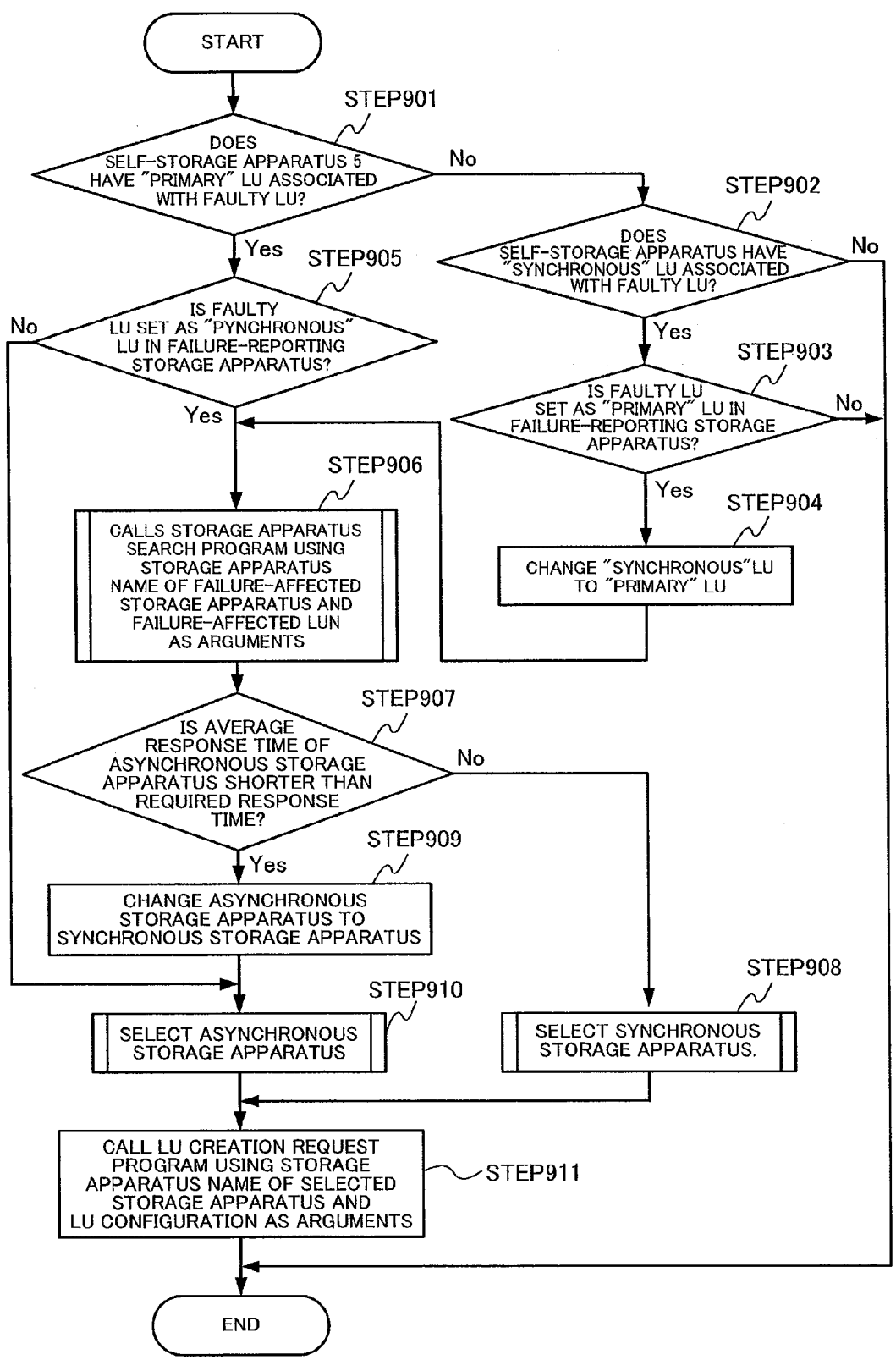
FIG. 9 is a flowchart for explaining the processing executed by a status monitoring program in the storage apparatus according to an embodiment of the invention.

FIG. 9 is a flowchart for explaining the processing executed by a status monitoring program 900 in the storage apparatus 5 according to an embodiment of the invention. Each storage apparatus 5 runs the status monitoring program 900 under the control of its processor 525, monitors the statuses of the other storage apparatuses 5 and, upon receipt of a failure report, makes an attempt to reestablish redundancy configuration.

The status monitoring program 900, determines, with reference to the role table 500, whether or not its storage apparatus 5 has a primary logical unit LU associated with the failure-affected logical unit LU (STEP901). If the storage apparatus 5 does not have a primary logical unit LU (STEP901; No), the storage apparatus 5 then determines whether or not the storage apparatus 5 has a synchronous logical unit LU associated with the failure-affected logical unit LU (STEP902). For example, having received a report of a failure in the logical unit LU0 from the storage apparatus S001, the storage apparatus S002 determines, by referring to the synchronous LU field 502 in its role table 500 in FIG. 5, that it has a logical unit, one assigned the role of a synchronous LU, associated with that failure-affected logical unit.

If the storage apparatus 5 has a synchronous logical unit LU (STEP902; Yes), the status monitoring program 900 then determines whether or not the failure-affected logical unit LU had been set as a primary logical unit LU in the failure-reporting storage apparatus 5 (STEP903). If it had been set as a primary logical unit (STEP903; Yes), the status monitoring program 900 updates the role table 500 to change the current synchronous logical unit LU to a primary logical unit LU (STEP904). At this time, the settings are changed as necessary so that the host computers 3 can send I/O access requests to the newly-set primary logical unit LU. For example, if iSCSI protocol is used, the new primary logical unit LU succeeds to the target name of the failure-affected logical unit LU.

The status monitoring program 900 then calls a storage apparatus search program 1000, which will be described later, using the storage apparatus name of the failure-affected storage apparatus 5, the logical unit number LUN of the logical unit LU, and the storage capacity of the logical unit as arguments (STEP906). The failure-affected storage apparatus 5 is the one having the failure-affected logical unit LU. The storage apparatus search program 1000 is a program for searching for a storage apparatus achieving a predetermined storage apparatus performance based on the succeeded storage apparatus name, logical unit number, and storage capacity.

If the storage apparatus 5 has a primary logical unit LU associated with the failure-affected logical unit LU (STEP901; Yes), the status monitoring program 900 then determines whether or not the failure-affected logical unit LU had been set as a synchronous logical unit LU in the failure-reporting storage apparatus 5 (STEP905). If the failure-affected logical unit has been set as a synchronous logical unit (STEP905; Yes), the status monitoring program 900 calls, just like the above, the storage apparatus search program 1000 using the storage apparatus name of the failure-affected storage apparatus 5 and the logical unit number LUN of the failure-affected logical unit as arguments (STEP906). In STEP905, if the status monitoring program 900 judges that the failure-affected logical unit LU had not been set as a synchronous logical unit LU in the failure-reporting storage apparatus 5, processing to select a storage apparatus 5 capable of providing an asynchronous logical unit is executed (STEP910). That processing will be described later.

Figure 10:
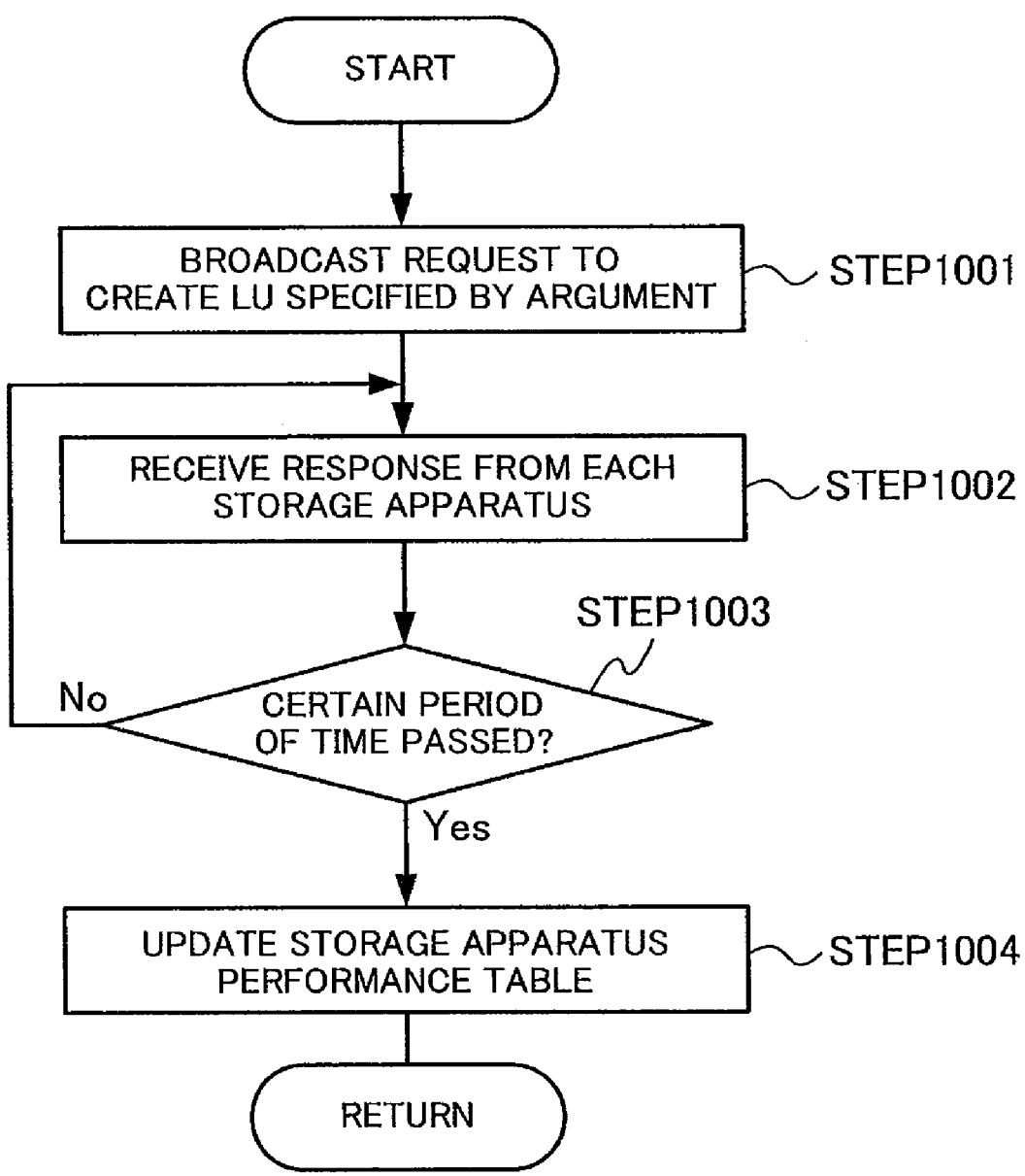
FIG. 10 is a flowchart for explaining the processing executed by a storage apparatus search program in the storage apparatus according to an embodiment of the invention.

FIG. 10 is a flowchart for explaining the processing executed by a storage apparatus search program 1000 in the storage apparatus 5 according to an embodiment of the invention. As described above, the storage apparatus search program 1000 is called by the status monitoring program 900. The storage apparatus 5 runs, under the control of its processor 525, the storage apparatus search program 1000; searches for storage apparatuses 5 capable of providing a new logical unit LU; and collects the storage apparatus performance information from the found storage apparatuses 5.

As shown in FIG. 10, the storage apparatus search program 1000 broadcasts a request to create a new logical unit to the other storage apparatuses 5 based on the succeeded storage apparatus name, logical unit number and storage capacity (STEP1001), and receives responses from them (STEP1002). A logical unit to be created is one having the same or larger storage capacity than the failure-affected logical unit. The responses include the names of the storage apparatuses 5 capable of creating a new logical unit and their average response times. After a certain period of time has passed (STEP1002; Yes), the storage apparatus search program 1000 updates the storage apparatus performance table 600 based on the responses from the respective storage apparatuses 5. In this way, the storage apparatus performance table 600 in the storage apparatus(es) 5 running the status monitoring program 900 is updated.

Figure 11:
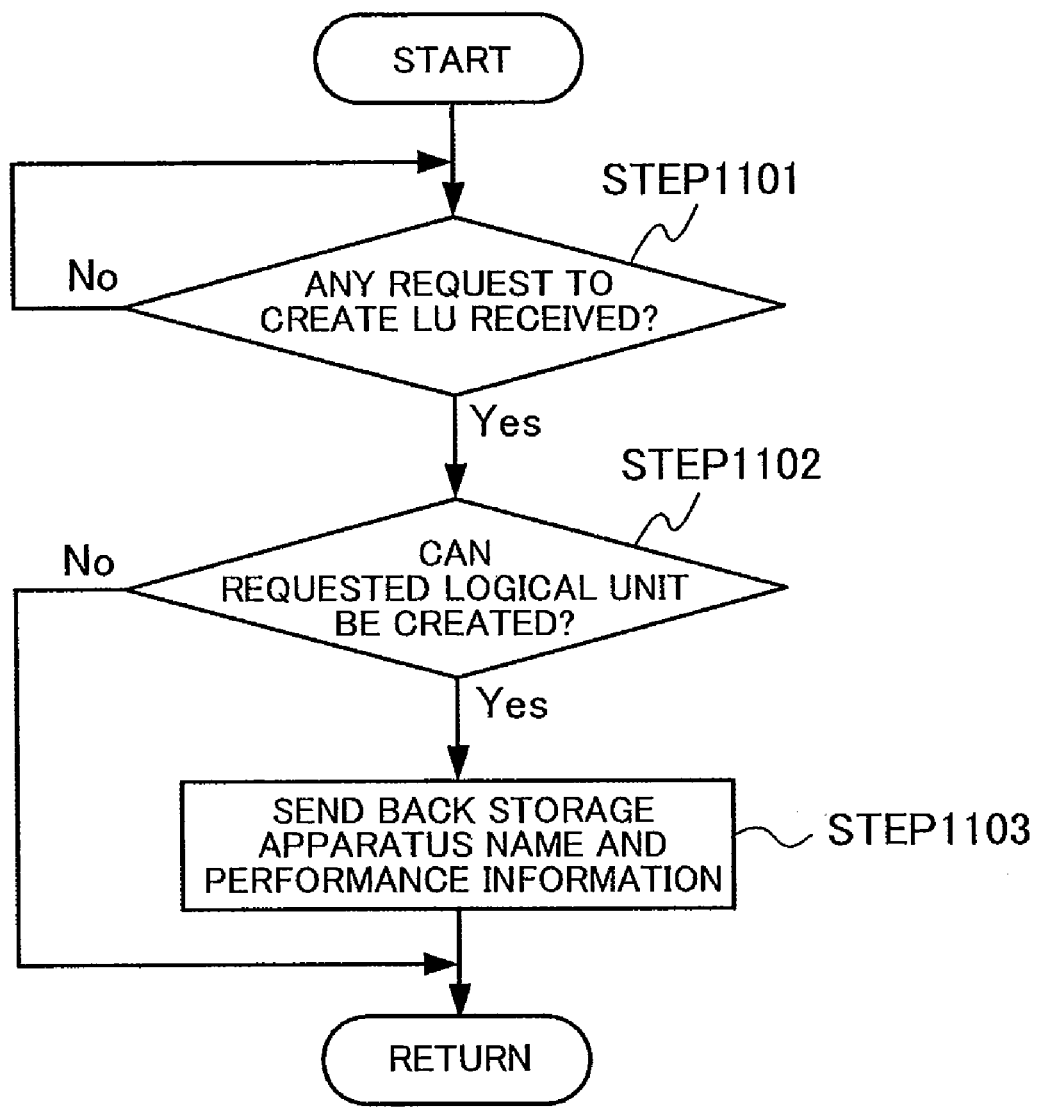
FIG. 11 is a flowchart for explaining the processing executed by a search response program in the storage apparatus according to an embodiment of the invention.

FIG. 11 is a flowchart for explaining the processing executed by a search response program 1100 in the storage apparatus 5 according to an embodiment of the invention. The search response program 1100 is a program for responding to a broadcasted request to create a logical unit. Each of the request-receiving storage apparatuses 5 runs, under the control of its processor 525, the search response program 1100 and, if it can provide a new logical unit LU, sends its own storage apparatus name and storage apparatus performance information to the storage apparatus that sent the request.

As shown in FIG. 11, having received a request to create a logical unit (STEP1101; Yes), the search response program 1100 in each request-receiving storage apparatus 5 determines whether or not the requested logical unit (STEP1102) can be created. In other words, the search response program 1100 determines whether or not a logical unit LU in its storage apparatus 5 can provide the requested storage size. If the search response program 1100 determines that the requested logical unit can be created, the search response program 1100 sends its own storage apparatus name and performance information to the storage apparatus 5 that sent the request using the storage apparatus search program 1000 (STEP1103).

Returning to FIG. 9, when the storage apparatus search program 1000 is called and the storage apparatus performance table 600 is updated (STEP906), the status monitoring program 900, with reference to the LU table 400 and storage apparatus performance table 600, determines whether or not the average response time of the storage apparatus 5 having the current asynchronous logical unit LU is shorter than the required response time for the synchronous logical unit LU (STEP907).

If the status monitoring program 900 determines that the average response time is not shorter than the required response time (STEP907; No), the role as a synchronous LU cannot be assigned to the current asynchronous logical unit LU, and accordingly, the status monitoring program 900 executes the processing shown in FIG. 12 to select a storage apparatus 5 (synchronous storage apparatus) providing a synchronous logical unit LU (STEP908).

Figure 12:
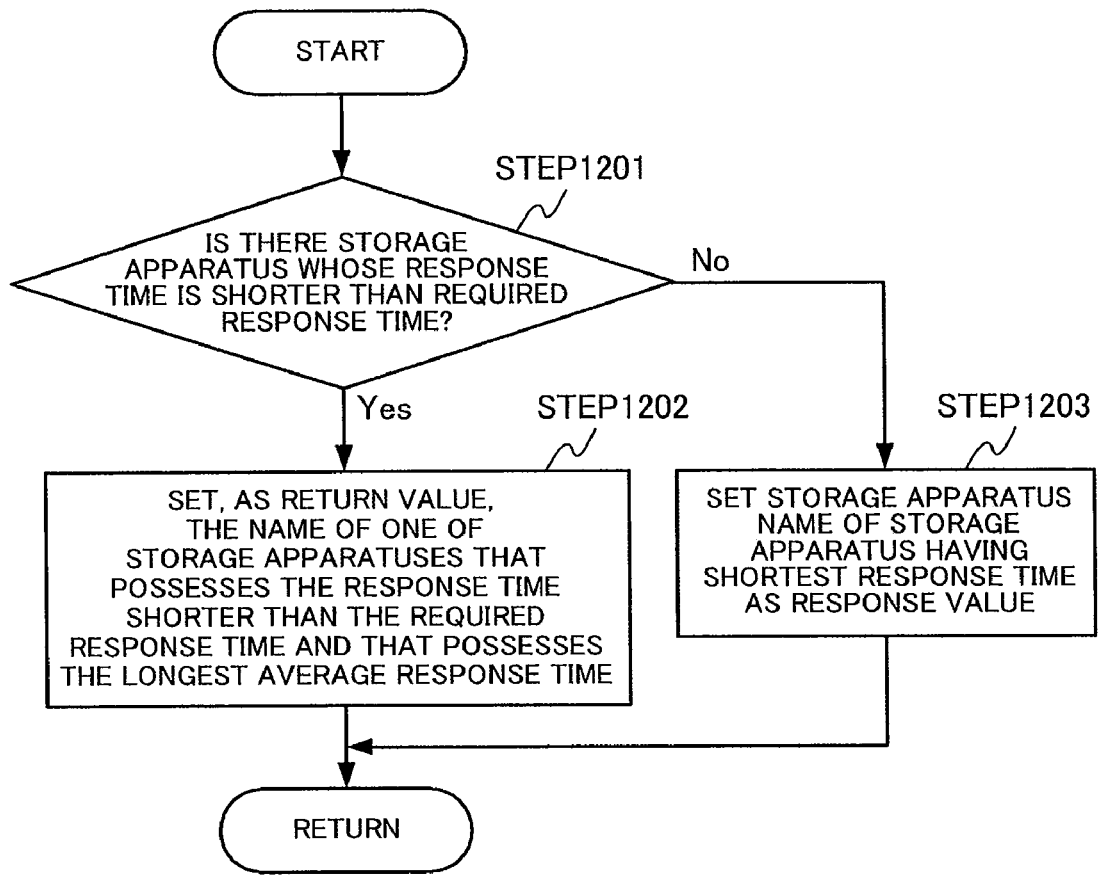
FIG. 12 is a flowchart for explaining the processing executed, in the storage apparatus according to an embodiment of the invention, in order to select a synchronous storage apparatus.

FIG. 12 is a flowchart for explaining the processing executed, in the storage apparatus 5 according to an embodiment of the invention, in order to select a synchronous storage apparatus.

As shown in FIG. 12, the status monitoring program 900 determines, with reference to the storage apparatus performance table 600, whether or not there is a storage apparatus 5 whose average response time is shorter than the required response time (STEP1201). If the status monitoring program 900 determines that there is such a storage apparatus 5 (STEP1201; Yes), the status monitoring program 900 selects, from among the storage apparatuses 5 that possess average response times shorter than the required response time, the storage apparatus 5 that possesses the longest average response time, and then sets, as a return value, the name of that storage apparatus 5 (STEP1202). If two or more storage apparatuses 5 can be selected, it may be possible to select a storage apparatus 5 based on random numbers or a storage apparatus 5 having a logical unit with a small LUN.

If the status monitoring program 900 determines that there is no storage apparatus 5 that possesses average response time shorter than the required response time (STEP1201; No), the status monitoring program 900 selects the storage apparatus 5 that possesses a shortest average response time, and then sets the name of that storage apparatus 5 as a return value (STEP1203).

Returning to FIG. 9, if the status monitoring program 900 determines that the average response time of the storage apparatus 5 having the current asynchronous logical unit LU is shorter than the required response time for the synchronous logical unit LU (STEP907; Yes), the status monitoring program 900 updates the role table 900 so that the role of a synchronous LU can be assigned to the current asynchronous logical unit LU in that storage apparatus 5 (STEP909). As a result, an asynchronous logical unit is no longer provided by any storage apparatus 5, so the status monitoring program 900 executes the processing, described below in detail with reference to FIG. 13, to select a storage apparatus 5 (asynchronous storage apparatus) for providing an asynchronous logical unit LU (STEP910).

Figure 13:
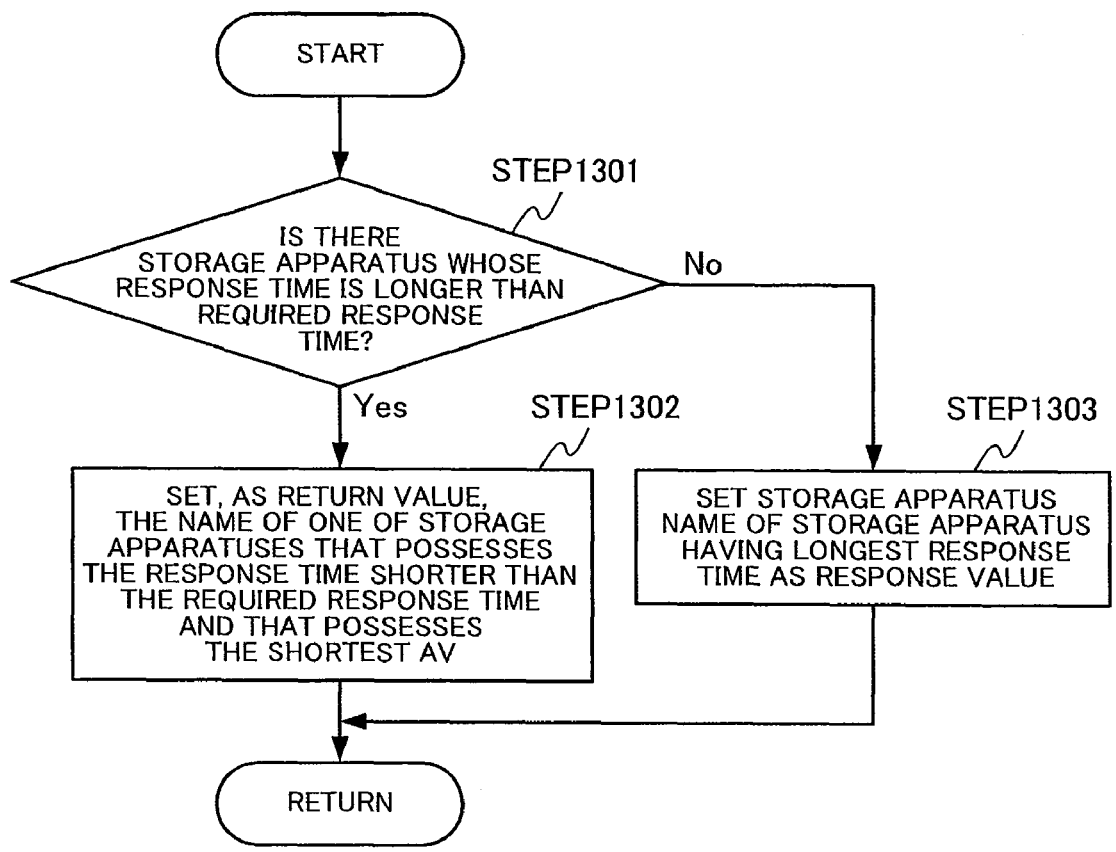
FIG. 13 is a flowchart for explaining the process executed, in the storage apparatus according to an embodiment of the invention, in order to select an asynchronous storage apparatus.

FIG. 13 is a flowchart for explaining the process executed, in the storage apparatus 5 according to an embodiment of the invention, in order to select an asynchronous storage apparatus.

As shown in FIG. 13, the status monitoring program 900 determines, with reference to the storage apparatus performance table 600, whether or not there is a storage apparatus 5 whose average response time is longer than the required response time (STEP1301). If the status monitoring program 900 determines that there is such a storage apparatus 5 (STEP1301; Yes), the status monitoring program 900 selects, from among the storage apparatuses 5 that posses average response times longer than the required response time, the storage apparatus 5 that possesses the shortest average response time and then sets, as a return value, the name of that storage apparatus 5 (STEP1302).

If the status monitoring program 900 determines that there is no storage apparatus 5 that possesses average response time longer than the required response time (STEP1301; No), the status monitoring program 900 selects the storage apparatus 5 that possesses the longest average response time, and sets, as a return value, the name of that storage apparatus 5 (STEP1303).

When a storage apparatus 5 having a synchronous or asynchronous logical unit LU is selected in STEP908 or STEP910, the status monitoring program 900 calls a logical unit creation request program 1400 to create a logical unit, using the storage apparatus name and its logical unit as arguments (STEP911).

Figure 14:
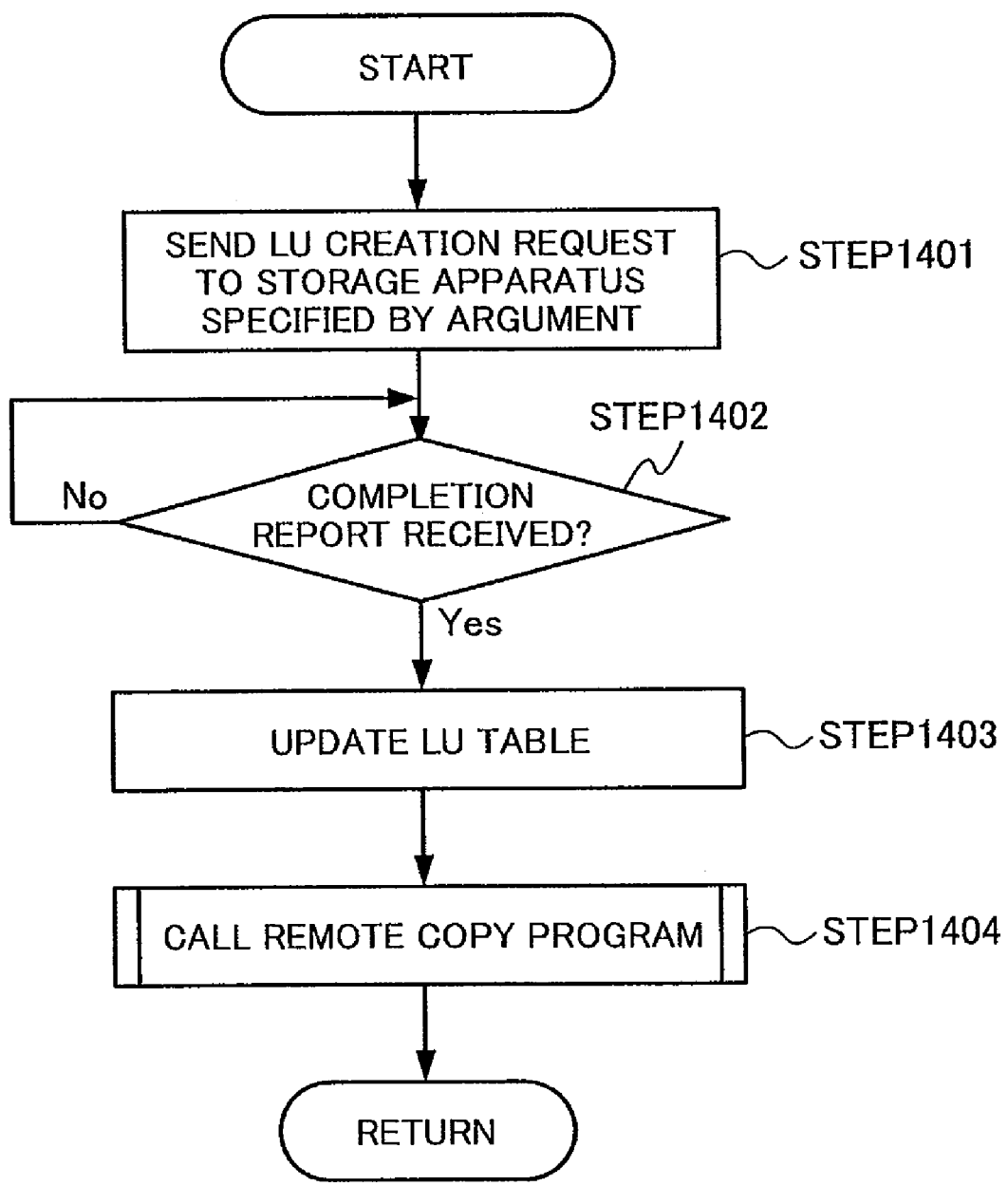
FIG. 14 is a flowchart for explaining the processing executed by a logical unit creation request program in the storage apparatus according to an embodiment of the invention.

FIG. 14 is a flowchart for explaining the processing executed by a logical unit creation request program 1400 in the storage apparatus 5 according to an embodiment of the invention.

As shown in FIG. 14, the logical unit creation request program 1400 sends a logical unit creation request to the storage apparatus 5 identified by the succeeded storage apparatus name (STEP1401) and waits for a completion report in response to the request (STEP1402). The storage apparatus 5, having received the logical unit creation request, executes the logical unit creation processing shown in FIG. 15 and sends back a completion report.

Having received the completion report (STEP1402; Yes), the logical unit creation request program 1400 updates the role table 500 based on the completion report (STEP1403). For example, if a synchronous logical unit LU is selected, that selected logical unit LU is registered in the synchronous LU field 502 in the role table 500.

The logical unit creation request program 1400 then calls a remote copy program and carries out remote copy with the created logical unit LU (STEP1404).

Figure 15:
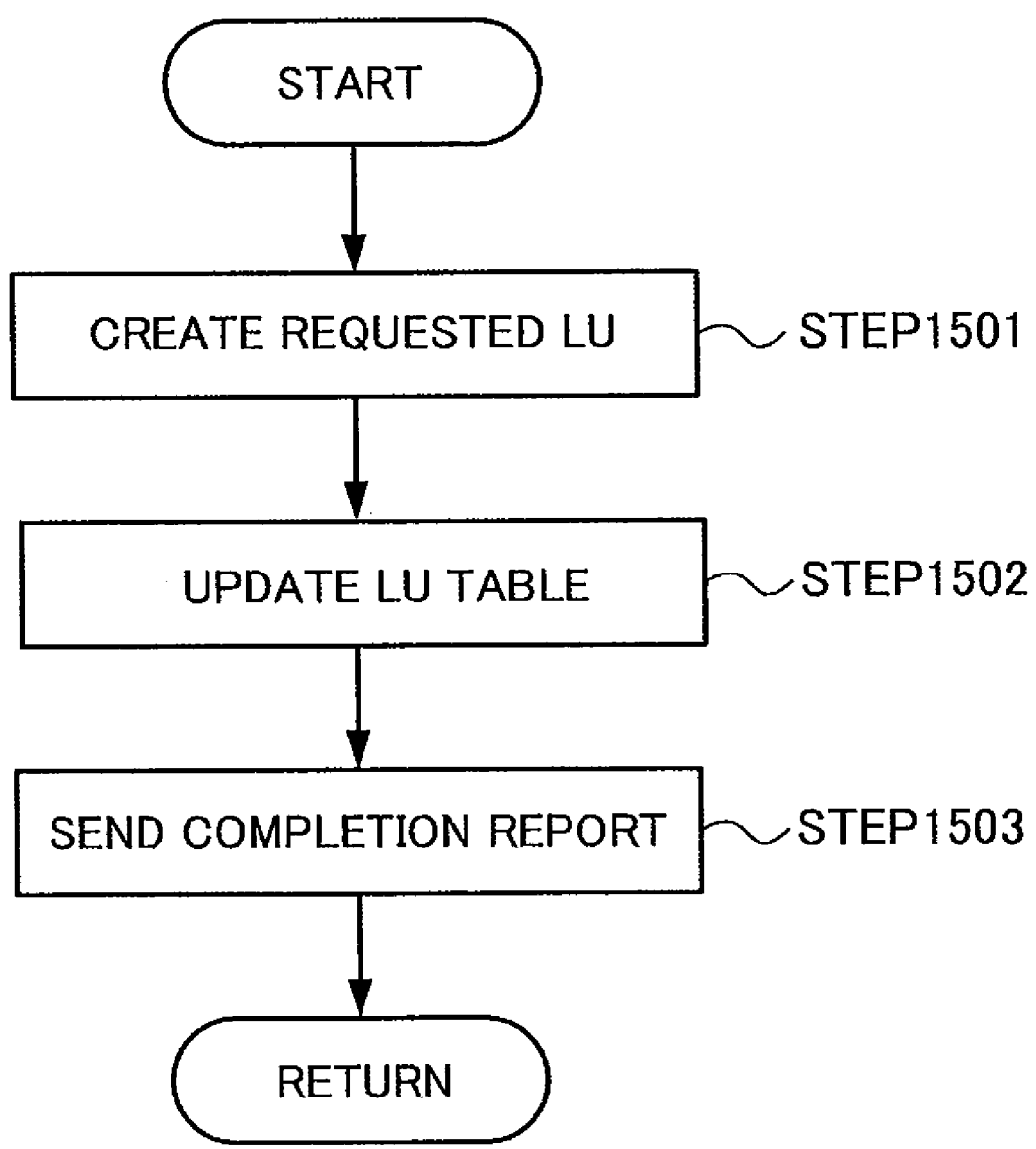
FIG. 15 is a flowchart for explaining the processing executed by a logical unit creation program in the storage apparatus according to an embodiment of the invention.

FIG. 15 is a flowchart for explaining the processing executed by a logical unit creation program 1500 in the storage apparatus 5 according to an embodiment of the invention.

In FIG. 15, the logical unit creation program 1500 that has received the logical unit creation request creates a logical unit LU with the disk drives 51 based on the request (STEP1501). The logical unit creation program 1500 then updates the LU table 400 and role table 500 (STEP1502), and sends a completion report (STEP1503).

Specific examples in the case where a failure occurs in the disk drives 51 in a storage apparatus 5 will be explained below with reference to FIGS. 16A-16E.

SPECIFIC EXAMPLE 1

In this example, it has been assumed that a failure has occurred in the logical unit LU0 (S001-0) in the storage apparatus S001 and the storage apparatus S002 has received a failure report.

In that case, in accordance with the role table 500, the logical unit LU (S002-1) in the storage apparatus S002, which had played the role of a "synchronous" LU for the faulty logical unit LU, is now assigned the role of a "primary" LU. The storage apparatus S002 broadcasts inquiries to the other storage apparatuses 5 on the network 2 about their storage apparatus performance information and updates its own storage apparatus performance table 600 to the latest state.

According to the updated storage apparatus performance table 600, the average response time of the logical unit S003-4) currently assigned the role of an asynchronous LU does not meet the response time requirement for the faulty logical unit LU. Thus, the storage apparatus S002 selects a storage apparatus 5 that can meet that response time performance requirement and sends a request to create a logical unit LU to that storage apparatus 5. In this example, it has been assumed that a logical unit LU9 is created in the storage apparatus S004. Therefore, the relevant entry in the role table 500 is updated to the content shown in FIG. 16A.

Alternatively, according to the updated storage apparatus performance table 600, if the storage apparatus S300 having the logical unit LU4 currently assigned the role of an asynchronous LU has an average response time that meets the response time performance requirement for the faulty logical unit LU (S001-0) (for example, the storage apparatus performance of the storage apparatus S003 is less than 20 ms), that logical unit LU (S003-4) is given the role of a "synchronous" LU and a storage apparatus 5 (S005-3) having a logical unit LU that should be given the role of an "asynchronous" LU is selected. The relevant entry in the role table 500 is updated to the content shown in FIG. 16B.

SPECIFIC EXAMPLE 2

In this example, it has been assumed that a failure has occurred in the logical unit LU1 (S001-1) in the storage apparatus S001 and the storage apparatus S002 has received a failure report.

The logical unit LU0 (S002-0) in the storage apparatus S002 had been playing the role of a "primary" LU for the faulty logical unit LU and the faulty logical unit LU had been playing the role of a "synchronous" LU in the failure-reporting storage apparatus S001. Accordingly, the storage apparatus S002 searches for a logical unit LU to replace the logical unit LU1 (S001-1) in the storage apparatus S001 with it.

For example, according to the updated storage apparatus performance table 600, the storage apparatus performance of the storage apparatus S003 does not meet the response time requirement for the faulty logical unit LU (S001-1); therefore, the storage apparatus S002 selects a storage apparatus 5 that can meet the response time performance requirement and sends a request to create a logical unit LU to that storage apparatus 5. In this example, it has been assumed that a logical unit LU9 in the storage apparatus S004 is created. The relevant entry in the role table 500 is updated to the content shown in FIG. 16C.

Alternatively, according to the updated storage apparatus performance table 600, if the storage apparatus S003 having the logical unit LU5 currently assigned the role of an asynchronous LU has an average response time performance that can meet the response time performance requirement for the faulty logical unit LU (S001-0) (for example, the storage apparatus performance of the storage apparatus S003 is less than 30 ms), that logical unit LU (S003-5) is newly assigned the role of a "synchronous" LU and a storage apparatus 5 (S005-3) having a logical unit LU that should be assigned the role of an "asynchronous" LU will be selected. In this way, the relevant entry in the role table 500 is updated to the content shown in FIG. 16D.

SPECIFIC EXAMPLE 3

In this example, it has been assumed that a failure has occurred in the logical unit LU6 (S001-6) in the storage apparatus S001 and the storage apparatus S002 has received a failure report.

The logical unit LU0 (S002-0) in the storage apparatus S002 had been playing the role of a "primary" LU for the faulty logical unit LU and the faulty logical unit LU had been playing the role of an "asynchronous" LU in the failure-reporting storage apparatus S001. Accordingly, the storage apparatus S002 selects a storage apparatus 5 having a logical unit LU that should be assigned the role of an "asynchronous" LU and sends a request to create a logical unit LU to that storage apparatus 5. In this way, the relevant entry in the role table 500 is updated to the content shown in FIG. 16E.

Figure 17:
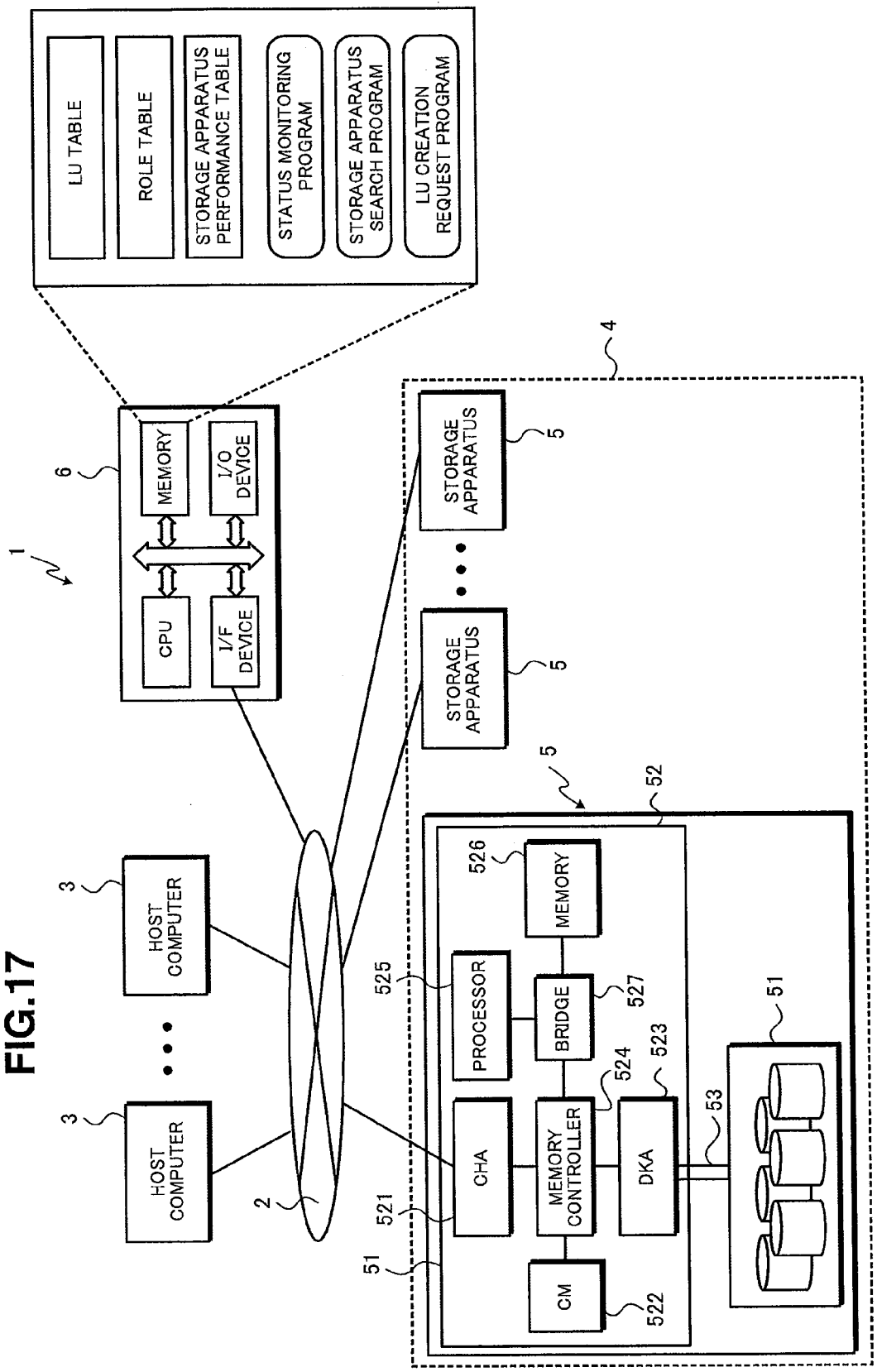
FIG. 17 is a diagram showing the configuration of a computer system according to an embodiment of the invention.

FIG. 17 is a diagram showing the configuration of a computer system 1 according to another embodiment of this invention. In the above embodiments, when a storage apparatus 5 detects a failure, it reports the failure occurrence to the other storage apparatuses 5 and one of the report-receiving storage apparatuses 5 establishes an optimum redundancy configuration, however, in this embodiment, the management console 6 in the computer system 1 establishes the optimum redundancy configuration.

More specifically, as shown in FIG. 17, the computer system 1 has a management console 6 for managing the entire storage system 4. The management console 6 is connected to the storage apparatuses 2 via a network 2 such as a LAN configured using, for example, Ethernet (registered trademark). In this embodiment, the host computers 3 and storage apparatuses 5 share the same network 2.

The management console 6 is typically a general purpose computer and so has a CPU 61, memory 62, I/O device 63, and I/F device 64. The management console 6 executes a predetermined management program under the control of the CPU 61 to perform desired management services. In this embodiment, the management console 6 searches, in accordance with the failure information sent from a storage apparatus 5, for the most suitable storage apparatus 5 and reestablishes the redundancy configuration including a newly formed logical unit LU.

For that purpose, the management console 6 has the abovementioned LU table 400, role table 500, and storage apparatus performance table 600 in its memory 62. The management console 6 also has a status monitoring program 900, storage apparatus search program 1000, and logical unit creation request program 1400 in its memory 62 so that it can execute these programs.

The structure of each storage apparatus 5 is the same as that shown in FIG. 2. However, because the status monitoring program 900, storage apparatus search program 1000, and logical unit creation request program 1400 are already provided in the management console 6, the storage apparatuses 5 is not required to store them in their memories 526.

In this embodiment, when a failure is detected in a storage apparatus 5, the status report program in that storage apparatus 5 does not report the status to the other storage apparatuses 5 registered in the role table 500, but reports it to the management console 6. The status monitoring program 900 in the management console 6 selects, in the same manner as described above and in accordance with the status report, a most suitable storage apparatus 5 and sends a request to create a logical unit LU to that storage apparatus 5. The management console 6 distributes the LU table 400 and role table 500 that are updated based on the created logical unit LU to all the redundant storage apparatuses 5 on the network 2.

This invention can be applied to any storage system composed of a plurality of storage apparatuses.

While the invention has been described with respect to a limited number of embodiments, those ordinary skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system comprising a plurality of storage apparatuses,
   wherein each of the storage apparatuses includes:
   one or more disk drives forming at least one logical unit, and
   a controller configured to control the disk drives,
   wherein each controller in the storage apparatuses has a role table where the logical units in the different storage apparatuses are associated with one another and the roles of the logical units are defined,
   wherein a first controller in a first storage apparatus performs remote copy between its logical unit and a logical unit associated with that logical unit in accordance with the role table,
   wherein when the first controller detects a failure in the first disk drives under its control, the first controller sends status information about the failure to at least a second storage apparatus from among the plurality of storage apparatuses,
   wherein a second controller in the second storage apparatus retrieves storage apparatuses capable of providing a logical unit that is a replacement for the first logical unit formed in the first disk drive, selects, from among the retrieved storage apparatuses, a predetermined storage apparatus and sends a creation request to create a logical unit to the selected predetermined storage apparatus,
   wherein the role table includes a logical unit assigned the role of a primary logical unit, a logical unit assigned the role of a synchronous logical unit to which synchronous remote copy is performed from the primary logical unit and a logical unit assigned the role of an asynchronous logical unit to which asynchronous remote copy is performed from the synchronous logical unit,
   wherein the second controller receives storage apparatus performance information from the failure-affected storage apparatus, and retrieves a storage apparatus capable of providing a logical unit that is a replacement for the first logical unit based on the received storage apparatus performance information, and
   wherein when the logical unit in the retrieved storage apparatus associated with the first logical unit is an asynchronous logical unit, the second controller changes the logical unit in the retrieved storage apparatus from the asynchronous logical unit to a synchronous logical unit.

2. The storage system according to claim 1, wherein when the second controller's logical unit associated with the first logical unit is a synchronous logical unit, the second controller changes its logical unit from a synchronous logical unit to a primary logical unit.

3. The storage system according to claim 1, wherein when the second controller's logical unit associated with the first logical unit is a synchronous logical unit and the first logical unit in the first storage apparatus had been a primary logical unit, the second controller changes its logical unit from the synchronous logical unit to a primary logical unit.

4. The storage system according to claim 1, wherein the second controller selects, from among the retrieved storage apparatuses, a storage apparatus capable of providing a logical unit to be assigned the role of a synchronous logical unit.

5. The storage system according to claim 1, wherein the second controller selects a storage apparatus whose performance meets the required response time for the first logical unit.

6. The storage system according to claim 1, wherein when the storage apparatus performance of the retrieved storage apparatus does not meet the required response time for the first logical unit, the second controller changes the logical unit in the found storage apparatus from the asynchronous logical unit to a synchronous logical unit.

7. The storage system according to claim 1, wherein the second controller selects, from among the found storage apparatuses, a storage apparatus capable of providing a logical unit to be assigned the role of an asynchronous logical unit.

8. The storage system according to claim 1, wherein the second controller selects a storage apparatus whose performance meets the required response time for the first logical unit.

9. The storage system according to claim 1, wherein the controller in the selected storage apparatus creates a logical unit based on the creation request.

10. The storage system according to claim 1, wherein the controller in the selected storage apparatus updates its role table based on the newly formed logical unit.

11. The storage system according to claim 1, wherein the selected storage apparatus performs remote copy between the new logical unit and its associated logical unit based on the updated role table.

12. The storage system according to claim 1, wherein the second controller updates its role table based on the new logical unit.

13. The storage system according to claim 1, wherein the status information includes the storage apparatus name of the first storage apparatus having the first disk drive in which a failure is detected and the logical unit number of the logical unit formed in the first disk drives.

14. A storage system management method, the storage system including a plurality of storage apparatuses that perform remote copy, wherein each of the storage apparatuses includes one or more disk drives forming at least one logical unit, and a controller configured to control the disk drives, the method comprising:

providing in each controller in the storage apparatuses a role table where the logical units in the different storage apparatuses are associated with one another and the roles of the logical units are defined, said role table containing a logical unit assigned the role of a primary logical unit, a logical unit assigned the role of a synchronous logical unit to which synchronous remote copy is performed from the primary logical unit, and a logical unit assigned the role of an asynchronous logical unit to which asynchronous remote copy is performed from the synchronous logical unit;

performing, by a first controller in a first storage apparatus, remote copy between its logical unit and a logical unit associated with that logical unit in accordance with the role table;

detecting, under control of a first controller in a first storage apparatus, a failure in a first disk drive under its control;

when the failure in the first disk drive is detected, sending status information about the failure to a second storage apparatus from among the plurality of storage apparatuses;

retrieving, under control of the second storage apparatus, a storage apparatus capable of providing a logical unit that is a replacement for the first logical unit formed in the first disk drive;

selecting, under control of the second storage apparatus, a predetermined storage apparatus from among the found storage apparatuses;

sending, under control of the second storage apparatus, a logical unit creation request to the selected, predetermined storage apparatus;

receiving, by the second controller, storage apparatus performance information from the failure-affected storage apparatus, and retrieving a storage apparatus capable of providing a logical unit that is a replacement for the first logical unit based on the received storage apparatus performance information, and when the logical unit in the retrieved storage apparatus associated with the first logical unit is an asynchronous logical unit, changing, by the second controller, the logical unit in the retrieved storage apparatus from the asynchronous logical unit to a synchronous logical unit.

15. A storage system comprising:

a first storage apparatus having a first disk drive where a first logical unit is formed, and a first controller configured to control the first disk drive;

a second storage apparatus operatively connected to the first storage apparatus and having a second disk drive where a second logical unit is formed and a second controller configured to control the second disk drive; and a third storage apparatus operatively connected to the second storage apparatus and having a third disk drive where a third logical unit is formed and a third controller configured to controls the third disk drive, wherein the first controller has a role table that defines roles in remote copy for the first logical unit and second logical unit, and copies the content of the first logical unit to the second logical unit in accordance with role table, wherein the first controller in the first storage apparatus performs remote copy between the first logical unit and the second logical unit in the second storage apparatus associated with first logical unit in accordance with the role table, wherein when the first controller detects a failure in the first disk drives under its control, the first controller sends status information about the failure to at least the second storage apparatus from among the plurality of storage apparatuses, wherein the second controller in the second storage apparatus retrieves storage apparatuses capable of providing a logical unit that is a replacement for the first logical unit formed in the first disk drive, selects, from among the retrieved storage apparatuses, a predetermined storage apparatus and sends a creation request to create a logical unit to the selected predetermined storage apparatus, wherein the role table includes a logical unit assigned the role of a primary logical unit, a logical unit assigned the role of a synchronous logical unit to which synchronous remote copy is performed from the primary logical unit and a logical unit assigned the role of an asynchronous logical unit to which asynchronous remote copy is performed from the synchronous logical unit, wherein the second controller receives storage apparatus performance information from the failure-affected storage apparatus, and retrieves a storage apparatus capable of providing a logical unit that is a replacement for the first logical unit based on the received storage apparatus performance information, and wherein when the logical unit in the retrieved storage apparatus associated with the first logical unit is an asynchronous logical unit, the second controller changes the logical unit in the retrieved storage apparatus from the asynchronous logical unit to a synchronous logical unit.

* * * * *